Figure 1:
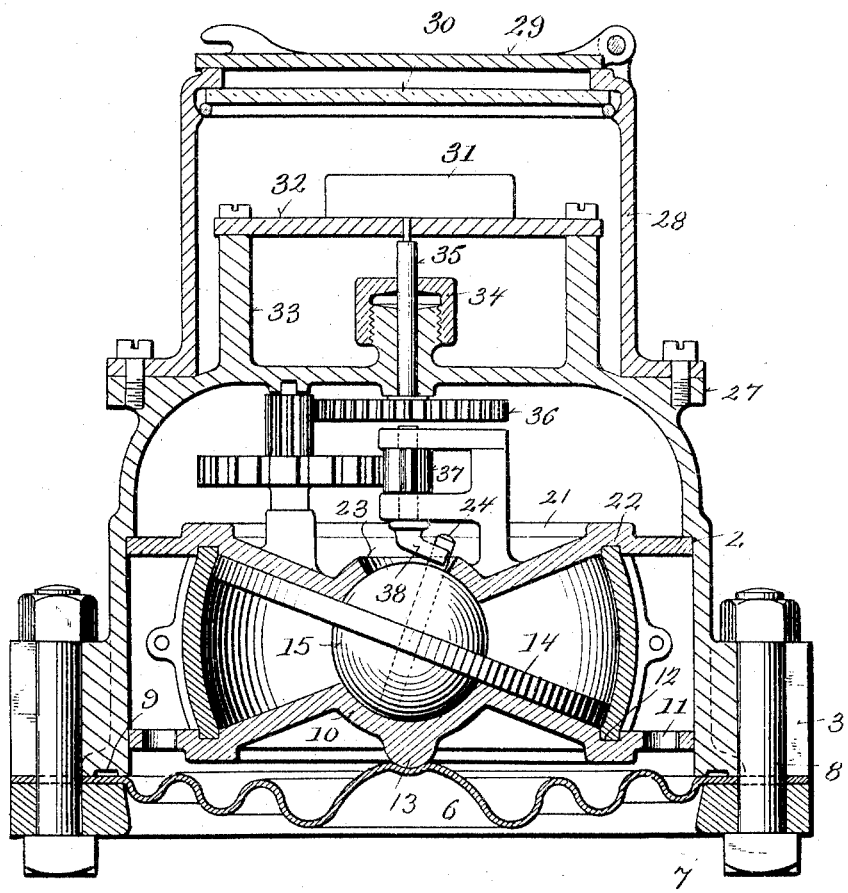

No. 783,518. PATENTED FEB. 28, 1905.
A. E. GUMZ & A. W. WINGENDER.
WATER METER.
APPLICATION FILED MAR. 24, 1902.

2 SHEETS—SHEET 1.

No. 783,518. PATENTED FEB. 28, 1905.
A. E. GUMZ & A. W. WINGENDER.
WATER METER.
APPLICATION FILED MAR. 24, 1902.

2 SHEETS—SHEET 2.

Witnesses:
Geo W Young
Lewis L Alsted

Inventors
Albert E. Gumz
Albert W. Wingender
By Jno. S. Green
Attorney

No. 783,518.

Patented February 28, 1905.

UNITED STATES PATENT OFFICE.

ALBERT E. GUMZ AND ALBERT W. WINGENDER, OF MILWAUKEE, WISCONSIN.

WATER-METER.

SPECIFICATION forming part of Letters Patent No. 783,518, dated February 28, 1905.

Application filed March 24, 1902. Serial No. 99,609.

*To all whom it may concern:*

Be it known that we, ALBERT E. GUMZ and ALBERT W. WINGENDER, citizens of the United States of America, residing at Milwaukee, in the county of Milwaukee and State of Wisconsin, have invented certain new and useful Improvements in Water-Meters, of which the following is a specification.

Our invention relates to meters, and more particularly to water-meters.

The object of our invention is to produce a water-meter provided with a wall, floor, or top for the housing or casing thereof which will yield outwardly when the water therein freezes or when any undue pressure is exerted within the meter and will return to normal position when the pressure is relieved. This object we attain in a meter constructed as described in the specification and illustrated in the drawings, in which—

Figure 2:
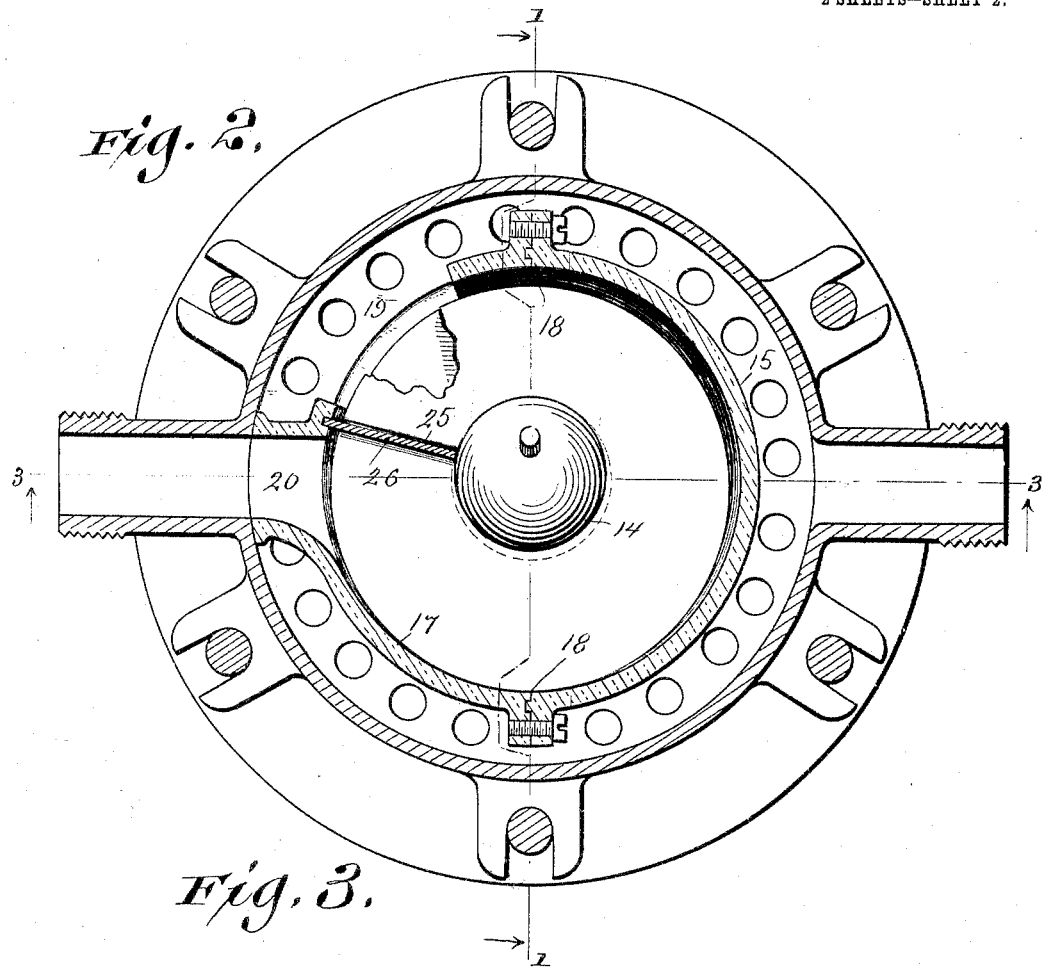
Figure 3:
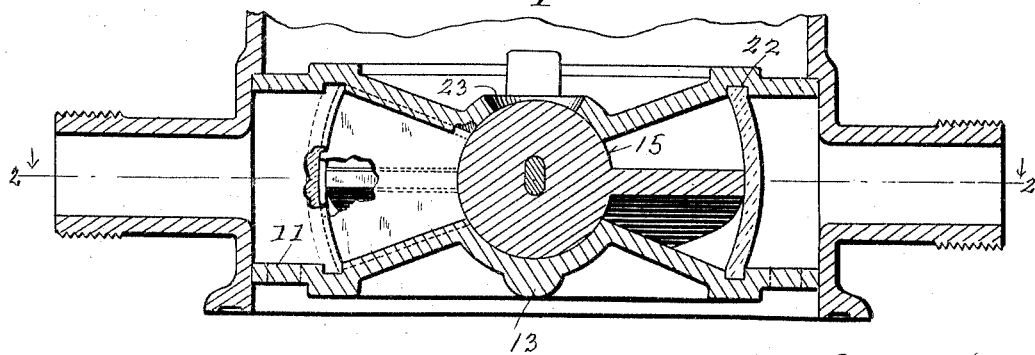

Figure 1 is a cross-sectional elevation taken on line 1 1 in Fig. 2 of the meter embodying our invention. Fig. 2 is a top cross-sectional view taken on line 2 2 in Fig. 3. Fig. 3 is a central vertical section taken on line 3 3 in Fig. 2.

Throughout the several views like elements are denoted by like characters.

Our invention is applicable to a number of different forms or styles of meters; but for the sake of illustration we have shown a disk-meter in which an outer or external housing or case 1 is employed, which is adapted to contain the internal mechanism of the meter. The interior of the housing from the bottom to a point 2 is cylindrically shaped and smoothly machined or finished. The housing is provided with ears 3, an inlet 4, and an outlet 5. A bottom 6, pressed or stamped from sheet metal of suitable thickness and stiffness and formed with suitable corrugations, is tightly held against the bottom of the housing by means of a ring 7 and bolts 8, extending through said ring and ears 3 of the housing. Suitable packing is interposed between the base of the housing and bottom 6, preferably in a channel 9 in said base and extending therearound. The bottom or diaphragm plate 6 will be of sufficient strength or stiffness to withstand the maximum, usual, or city pressure exerted within the meter, but weak enough to yieldingly give outward when the water within the meter freezes or when an undue pressure or extreme pressure from any cause, such as when a pressure of a water-hammer is exerted within the meter.

Within housing 1 and supported by the diaphragm-bottom 6 is a housing for the meter proper, which consists of a circular bottom plate 10, machined to snugly fit housing 1 and provided with openings 11, extending around the same, as shown in Fig. 2. Plate 10 between a circular groove 12 within the circle of openings 11 and a spherical depression 13 in the top thereof is conical in form. A flat circular disk 14, formed of hard rubber or other suitable material and provided at its center with a spherical bearing portion 15, is supported by plate 10 so that the sphere of the disk 14 lies within depression 13. This disk as the water flows through the meter is adapted to gyrate. The sides of the housing for the gyratory disk are formed in two sections 16 and 17, which are clamped together with coengaging parts, as shown at 18 18 in Fig. 2. Section 16 is semicircular in form, while section 17 is provided with an inlet-port 19, through which the water enters into said disk-housing, and an outlet-port 20, through which the water leaves said disk-housing. The lower edges of sections 16 and 17 are adapted to lie within grooved channel 12 in the base-plate 10. A top-plate 21 is provided for the disk-housing, which has a groove 22 adapted to fit over the top of sections 16 and 17, and said top plate is provided with a circular opening 23 at its center, through which a pin 24, secured to sphere 15, is adapted to pass. Disk 14, as shown in Fig. 2, on one side from its outer periphery to the sphere 15 is split, as shown at 25, through which a metallic abutment 26, in the nature of a plate, passes. This abutment is securely mortised into section 17 of the side of the housing and loosely but snugly fits within grooves in the top plate 21 and bottom plate 10 of the disk-housing, as indicated by dotted lines in Fig. 3. The inner edge of abutment 26 is adapted to snugly fit the sphere of disk 14 and act as a guide for the water entering the disk-chamber to guide said water around sphere 15.

The external housing 1 is provided with a flange 27, extending therearound, and to said flange a bonnet 28 is adapted to be secured in any suitable manner, preferably by means of screws, as shown in Fig. 1. Said bonnet is provided with a hinged lid 29 above a glass plate 30. Beneath said glass plate an indicating mechanism (indicated by 31) of any suitable type is placed on a supporting-plate 32, secured to a cylindrical flange 33 of the external housing.

Through a suitable stuffing-box 34 in the top of the external housing 1 a rod 35 extends. Said rod by any suitable means is adapted to operate the indicating mechanism 31. Secured to the lower end of the rod 35 is a gear-wheel 36, which is adapted to be rotated by a train of gears which will be operated by means of a pinion 37, mounted upon a shaft, the lower end of which is bent, as shown at 38, and lies in the path of pin 24. As the water enters inlet 4 of the external housing after filing the space between bottom plate 6 of the external housing, the disk-housing and the space above the same through opening 23, it passes through the disk-housing and causes the disk to gyrate and as a certain amount of water is discharged at each complete movement of the disk equal to the contents of the entire disk-chamber the number of gyrations of the disk will be indicated by indicator 31, through the intermediate train of gears the exact amount of water passing through the meter will be indicated.

From the construction of the meter it will be seen that if undue pressure is exerted within the disk-housing the bottom of the same may move downward, as the parts thereof—namely, the sides, top plate, and bottom plate—are not secured together, but are held in place by means of pressure exerted by the bottom plate 6 of the external housing. If undue pressure is exerted in a downward direction against the top plate 21 of the disk-housing, the same may move downward, and the gears and pinions forming the intermediate train will be of sufficient width to allow for the slight movement necessary.

We do not limit ourselves to the particular type of meter shown; but any meter which has a portion of its external housing formed in the nature of an expansible diaphragm or formed so that when undue pressure is exerted within the meter said portion will give outwardly and return to normal position when the pressure is relieved will come within the spirit of our invention.

Having thus described our invention, we claim—

1. In a water-meter of the disk type, an external housing or meter-case provided with an expansible diaphragm-bottom, a disk-housing supported by said bottom, said disk-housing consisting of a bottom plate, side plates formed in two sections secured together and resting on the bottom plate, and a top plate resting on said side sections.

2. In a meter, an external housing or meter-case, a yielding diaphragm-bottom secured to said case, and a disk-housing movable within the external housing and bearing against the diaphragm-bottom near its center; said disk-housing being formed of separable sections adapted to be normally held together by said diaphragm.

3. In a water-meter, a disk-housing comprising separable coengaging sections, an external housing, a resilient closing-head for the external housing, and means for rigidly securing said closing-head to the external housing; said closing-head adapted to bear centrally against the disk-housing whereby its sections are yieldingly held in normal position.

4. In a water-meter, the combination with a main casing, of a disk-casing arranged therein, and a corrugated resilient wall for said main casing arranged to bear centrally against said disk-casing to yieldingly maintain it in proper position.

5. In a disk-meter, the combination of a main casing provided with a resilient closing-head, and a separable disk-casing within the main casing and bearing against the closing-head near its center.

6. A disk-meter comprising an outer casing, a yielding bottom plate for said casing, means rigidly securing said plate to said casing, and a vertically-movable inner casing supported upon the bottom plate near its center.

7. In a water-meter, a disk-housing comprising separable coengaging sections, an external housing, and a resilient closing-head for the external housing adapted to bear centrally against the disk-housing whereby the sections of the disk-housing are yieldingly held in normal position.

Signed by us at Milwaukee, Wisconsin, this 1st day of February, A. D. 1902.

ALBERT E. GUMZ.
ALBERT W. WINGENDER.

Witnesses:
   Jno. S. Green,
   Thomas P. Carter.